United States Patent [19]

Schafer et al.

[11] 3,858,236

[45] Dec. 31, 1974

[54] FOUR LAYER CONTROLLABLE SEMICONDUCTOR RECTIFIER WITH IMPROVED FIRING PROPAGATION SPEED

[75] Inventors: Horst Schäfer, Zirndorf; Lothar Herbing, Nurnberg, both of Germany

[73] Assignee: Semikron Gesellschaft fur Gleichrichterbau und Elektronik mbH, Nurnberg, Germany

[22] Filed: Mar. 8, 1973

[21] Appl. No.: 339,045

[30] Foreign Application Priority Data

Mar. 8, 1972 Germany............................ 2211116

[52] U.S. Cl.......................... 357/38, 357/86, 357/89

[51] Int. Cl.......................... H01l 11/00, H01l 15/00

[58] Field of Search............... 317/235, 40, 41.1, 44

[56] References Cited

UNITED STATES PATENTS

| | | | |
|---|---|---|---|
| 2,993,154 | 7/1961 | Goldey et al. | 317/235 AE |
| 3,124,703 | 3/1964 | Sylvan | 317/235 AE |
| 3,428,874 | 2/1969 | Gerlach | 317/235 AB |
| 3,573,572 | 4/1971 | Cooper | 317/235 AB |
| 3,671,821 | 6/1972 | Nakata et al. | 317/235 AE |
| 3,697,830 | 10/1972 | Dale | 317/235 AB |
| 3,731,162 | 5/1973 | Suenaga et al. | 317/235 R |
| 3,758,831 | 9/1973 | Clark | 317/235 AE |

FOREIGN PATENTS OR APPLICATIONS

| | | | |
|---|---|---|---|
| 1,555,029 | 12/1968 | France | 317/235 AB |

*Primary Examiner*—Andrew J. James
*Attorney, Agent, or Firm*—Spencer & Kaye

[57] ABSTRACT

An improved semiconductor rectifier device of the type having a monocrystalline semiconductor body having four layer-type zones of alternatingly opposite conductivity types with that portion of the one inner zone which supports the control electrode and extends with the adjacent outer zone serving as the emitter zone to the same major surface of the semiconductor body as the emitter zone, a respective load current electrode ohmically contacting each of the two outer zones of the semiconductor body, and the control electrode ohmically contacting the one of the inner zones of the semiconductor body which borders on the emitter zone. A highly doped zone of a conductivity type opposite that of the above-mentioned one inner zone is formed within said portion of that inner zone at the major surface and laterally displaced from the emitter zone and the control electrode is positioned on the major surface so that at least a portion of the pn-junction formed by the highly doped zone and the inner zone is between the control electrode and the emitter zone, whereby the highly doped zone acts as a barrier for the charge carriers of the control current.

5 Claims, 2 Drawing Figures

FOUR LAYER CONTROLLABLE SEMICONDUCTOR RECTIFIER WITH IMPROVED FIRING PROPAGATION SPEED

BACKGROUND OF THE INVENTION

The present invention relates to an improved controllable semiconductor rectifier device of the type comprising a monocrystalline semiconductor body having four layer-type zones of alternatingly opposite conductivity type, the two outer zones of which each have a contact electrode for the load current and the one inner zone which borders the outer zone serving as the emitter zone of the device is provided with a contact electrode for the control current.

When switching such controllable semiconductor rectifier devices, so-called thyristors, from the nonconductive to the conductive state (which is also sometimes called switching through), the increasing load current from the anode to the cathode is known to be initially limited to a current path adjacent the control electrode due to the potential conditions determined by the movement of the charge carriers. The cross section of this current path is determined substantially by that area of the emitter zone in which the control current causes the emission of charge carriers into the adjacent base zone. This limitation of the current flow cross section and the relatively slow propagation speed of the charge carrier emission across the emitter surface may lead, when the load current increases sharply, to an undue specific load on this first current path even a short time after switching through, and additionally, due to the insufficient heat dissipation property of the semiconductor material, may lead to undesirable local heating of the device and thus to its malfunction.

The slow firing propagation speed is known to be the reason that when such devices are used with operating frequencies of more than about 1 kHz, the initial current path cannot be widened to the available current flow cross section during the conductive phase, and thus the permissible current load of the devices at low operating frequencies must be reduced.

To prevent these drawbacks, i.e. to increase the firing propagation speed or the so-called critical current rise speed $di/dt$, it is therefore necessary that the charge carriers of the base zone, which travel toward the emitter zone due to the control pulse and excite the emitter zone into emission, be directed toward as large an area as possible of the emitter zone.

In such devices it is not possible to increase the firing current output without limit and, in any case such an increase does not bring about the desired results. This is particularly true with a device having a control electrode with a point-type design which is located in an edge zone of the emitter surface, or outside of same, due to the fact that depending on the disposition of the electrical field between control electrode and emitter contact, the charge carriers travel preferably to the area most adjacent to the emitter contact.

Special embodiments are known for the control electrode and arrangements thereof with respect to the emitter zone, all of which result in a decrease in the emitter contact surface or in an increase in the size of the control electrode and thus do not meet the requirement for optimum current load carrying capability.

Thyristors are also known which have the so-called transverse field emitters. In such devices the emitter contact electrode ends at a considerable distance from the emitter edge zone which is opposite the control electrode. The remaining, nonmetallized emitter zone surface then forms a limiting resistance for the control current flowing toward the emitter zone which causes a voltage drop. This voltage drop results in an electrical field which accelerates the propagation of the charge carrier emission and becomes effective in the plane of the base zone. With such arrangements, however, the emitter contact surface must be reduced.

Thyristors are also known in which the firing propagation is effected with the aid of an arrangement formed on the same semiconductor body and acting as an auxiliary thyristor. This auxiliary thyristor, which is fired with a conventional control electrode, shows the same behavior as the main thyristor and its anode current actuates firing of the main thyristor. Such embodiments have, in addition to the drawback of the reduced emitter contact surface, the further drawback of requiring substantial expenditures for their construction and manufacture.

SUMMARY OF THE INVENTION

It is therefore the object of the present invention to provide a controllable semiconductor rectifier device which does not exhibit the drawbacks inherent to the known arrangements and to accomplish this with a much improved firing propagation speed.

The above object is achieved according to the present invention in that a controllable semiconductor rectifier device, which is of the type including a monocrystalline semiconductor body having four layer-type zones of alternatingly opposite conductivity type with that portion of the one inner zone which supports the control electrode extending with the adjacent outer zone serving as the emitter zone of the device to the same major surface of the semiconductor body respective load current electrodes ohmically contacting the two outer zones of the semiconductor body, and the control electrode ohmically contacting the abovementioned inner zone at the major surface of the semiconductor body, is provided with a barrier for the charge carriers of the control current. The barrier is provided by disposing a highly doped zone of a conductivity type which is opposite to that of the above mentioned inner zone within said portion of such inner zone so that it is laterally spaced from the emitter zone and the pn-junction formed between the highly doped zone and the inner zone extends to the major surface of the semiconductor body, with at least a portion thereof being between the control electrode and the emitter zone.

DESCRIPTION OF THE PREFERRED EMBODIMENTS

Figure 1:
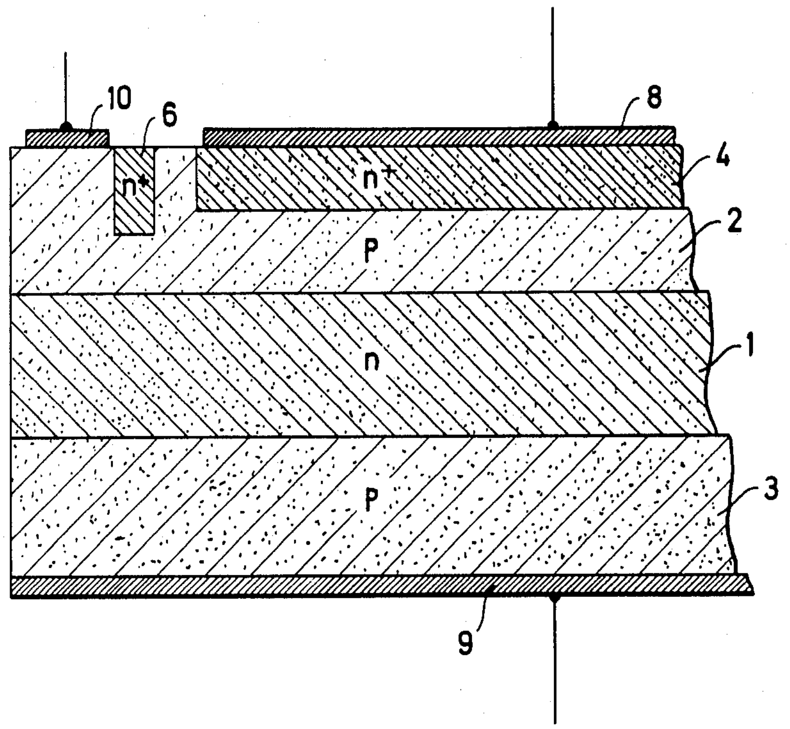
FIG. 1 is a cross-sectional view, to a scale which is substantially enlarged for the sake of clarity, showing the structure of the semiconductor body of one embodiment of a device according to the present invention.

Referring now to the drawing, there is shown a monocrystalline semiconductor body having four layer type zones of alternatingly opposite conductivity type forming a pnpn layer sequence. The inner zone 1, which is weakly doped n-conductive zone, is bordered on one of its surfaces by a higher doped outer p-conductive zone 3 and is bordered on its opposite surface by a higher doped inner p-conductive zone 2, which, in turn borders on and is the base zone of the $n^+$-conductive outer zone 4 which serves as the emitter zone of the device. As shown, a portion of the inner zone 2 extends to the same major surface of the semiconductor body as the outer emitter zone 4. The emitter zone 4 is ohmically contacted by a load current contact electrode 8 which forms the emitter contact or the cathode of the device. The outer zone 3 is ohmically contacted by a further load current contact electrode 9 which serves as the anode connection for the device. Additionally as is conventional in the art, the inner zone 2 is ohmically contacted at the major surface of the semiconductor device by a control contact electrode 10.

If a voltage is applied to the above-described known layer structure such that the voltage at anode 9 is positive with respect to cathode 8, and if in addition the control electrode 10 and the cathode 8 are disposed in a closed control circuit with a higher potential at the control electrode 10, holes are injected in the area of the control electrode 10 from the surface layer of the base zone 2, which has a high doping concentration, into the lower partial layers of this zone as a result of the control current. These charge carriers move substantially parallel to the pn-junction disposed between the zones 1 and 2 and corresponding with the electrical field existing between the control electrode 10 and the emitter contact electrode or cathode 8 until they reach the emitter zone 4 and there cause a change in the potential conditions by an accumulation of charges in the region thereof nearest the control electrode so that electrons are injected into the base zone 2. These electrons diffuse, under the influence of the electrical field between the anode 9 and the cathode 8, through zone 2 into the highly ohmic zone 1 and there effect a change in the potential conditions and thus an injection of holes from the outer zone 3 into the inner zones 1 and 2. The injection of charge carriers in the four-layer structure which increases in this manner results in a current path for the load current from the anode 9 to the cathode 8.

In order to increase the attraction range for the holes coming from the control electrode 10 at the emitter zone 4, and thus the initial injection, the above-described layer structure is provided, according to the present invention, with a highly doped zone 6 which acts as a barrier for the holes. The highly doped zone 6 is of a conductivity type ($n^+$) opposite that of the base zone 2 and is disposed in the base zone 2 adjacent the major surface of the semiconductor body so that the pn-junction formed between the zones 2 and 6 extends to the major surface of the semiconductor body between the control electrode 10 and the emitter zone 4 and laterally spaced from each. The zone 6 extends, in an advantageous manner, parallel to the edge of the emitter zone 4 at a distance from the latter which has been determined with a view toward production conditions, and extends into the base zone 2 to a depth which is determined so that it is sufficiently spaced from the space charge zone formed during operation and still satisfies the requirement for the highest possible barrier effect and depth deflection of the holes.

With a semiconductor device including the zone 6, when a pulse is applied to the control electrode 10, which pulse is positive with respect to the emitter zone, the inner border area of zone 6 which faces the control electrode 10 is polarized in the forward direction, while the border area of the zone 6 facing the emitter zone 4 is polarized in the blocking direction. According to the potential distribution existing between the control electrode 10 and the emitter zone 4, the zone 6 near the control electrode has approximately the potential of the control pulse so that, since no charge carriers can flow through the zone 6 toward the emitter zone 4, the holes caused by the control pulse can travel to the emitter zone 4 only on paths leading around the zone 6. Thus the holes will travel to a region of the emitter zone 4 which is larger than that of the conventional arrangements and substantially faces the anode 9 of the layer sequence.

The width of zone 6 is determined by its minimum distance from the emitter zone 4 as required in the manufacturing process and by the distance of the control electrode 10 from the emitter zone 4. With embodiments of the arrangement of the present invention in which the zone 6 had a width of between 200 and 500$\mu$ and a depth of between 10 and 30$\mu$, twice to five times higher current rise speeds were attained compared to the conventional arrangements. The depth of the zone 6 should advantageously lie at a value in the area up to twice the depth of the emitter zone 4.

Figure 2:
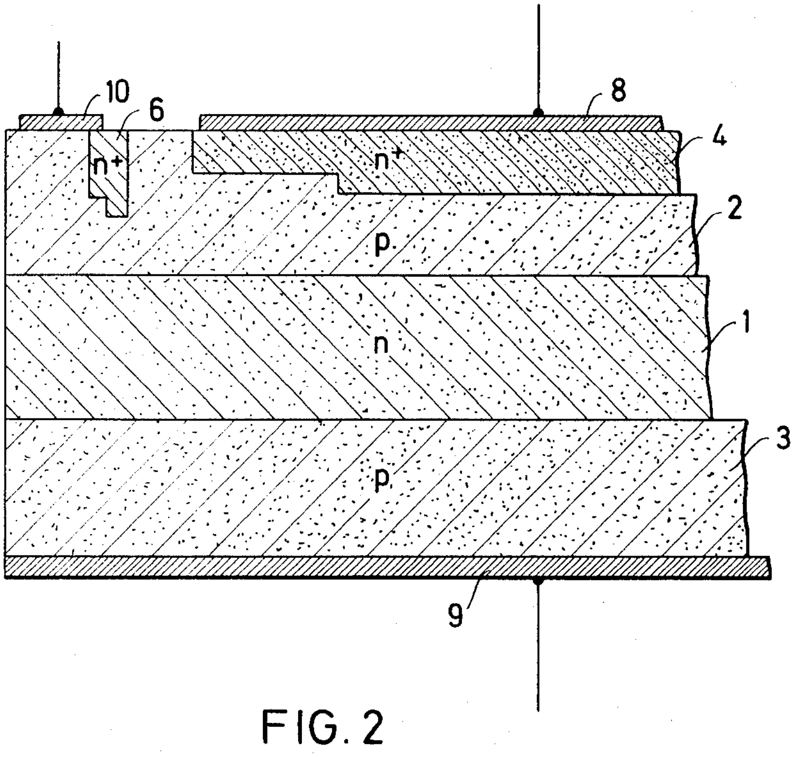
FIG. 2 is a cross-sectional view of another embodiment of a controllable semiconductor device according to the present invention.

It should be noted that a number of modifications of the basic structural arrangement as illustrated are possible within the scope of the invention. For example although the zone 6 has been shown as being laterally spaced from the control contact 10, it is possible to arrange the control electrode 10 so that it extends over and contacts a portion of the surface of the zone 6 as shown in FIG. 2. Moreover, in order to enhance the deflection of the charge carriers, the zone 6 may have a depth which increases in the lateral direction toward the edge of the emitter zone 4 as also shown in FIG. 2. Moreover, the depth of the edge portion of the emitter zone 4 adjacent to the zone 6 may be less than that of the remaining area of the emitter zone as further shown in FIG. 2.

The length of zone 6, i.e. its path perpendicular to the plane of the drawing depends, in arrangements wherein the zone 6 is not contacted by the control electrode 10, on the length of the edge zone of the oppositely disposed emitter contact 8 and in arrangements wherein the zone 6 is contacted by the control electrode 10 on the expanse of the latter.

The embodiment of the present invention which is illustrated can be made by initially subjecting a semiconductor wafer having, for example, n-type conductivity and a suitable thickness, to a known diffusion process to produce a pnp layer sequence, i.e. zones 2, 1 and 3 respectively. Thereafter, in order to produce the $n^+$-conductive barrier zone 6, which is to have a greater penetration depth than the emitter zone 4, the barrier zone 6 is initially produced by diffusion via a masking process until it reaches a predetermined depth. In a subsequent process step the $n^+$-conductive emitter zone 4 is produced, also by diffusion and with the aid of the masking technique, and simultaneously the penetration depth of the barrier zone 6 is increased to the desired value. Then the contact electrodes 8, 9 and 10 are applied in positions, for example, as they are shown in the drawing. The thus produced layer sequence is finally subjected to a plurality of process steps in order to connect current leads, to stabilize the electrical and physical properties and to encapsulate the device, process steps which are all part of the known state of the art.

It will be understood that the above description of the present invention is susceptible to various modifications, changes and adaptations, and the same are intended to be comprehended within the meaning and range of equivalents of the appended claims.

We claim:

1. In a controllable semiconductor rectifier device including: a monocrystalline semiconductor body having four layer-type zones of alternatingly opposite conductivity types and with the one of the inner zones of said semiconductor body which borders on the one of the outer zones of said semiconductor body which serves as the emitter zone of the device having a portion thereof which is to support the control electrode and extends to the same major surface of said semiconductor body as said emitter zone; a respective load current electrode ohmically contacting each of the two outer zones of said semiconductor body; and a control electrode ohmically contacting said one of the inner zones, the improvement comprising:

a highly doped zone of a conductivity type opposite that of said one of the inner zones formed within said portion of said one of the inner zones and laterally spaced from said emitter zone, said highly doped zone forming a pn-junction with said one of the inner zones which pn-junction extends to said major surface; and said control electrode contacting said one of the inner zones at said major surface and overlying and ohmically contacting at least a portion of said highly doped zone along said surface, said control electrode being positioned such that at least a portion of said pn-junction is between the control electrode and said emitter zone whereby said highly doped zone serves as a barrier for the charge carriers of the control current.

2. A controllable semiconductor rectifier device as defined in claim 1 wherein said highly doped zone has a depth from said major surface which is greater than the depth from said major surface of the adjacent portion of said emitter zone.

3. A controllable semiconductor rectifier device as defined in claim 2 wherein the depth of said highly doped zone is twice the depth of the adjacent portion of the emitter zone.

4. A controllable semiconductor rectifier device as defined in claim 1 wherein the depth of the edge portion of said emitter zone which is adjacent said highly doped zone is less than the depth of the remaining region of said emitter zone.

5. A controllable semiconductor rectifier device as defined in claim 1 wherein said highly doped zone has a depth which increases in the lateral direction toward said emitter zone.

* * * * *